US008349435B2

(12) United States Patent
Shiao et al.

(10) Patent No.: US 8,349,435 B2
(45) Date of Patent: Jan. 8, 2013

(54) MINERAL SURFACED ASPHALT-BASED ROOFING PRODUCTS WITH ENCAPSULATED HEALING AGENTS AND METHODS OF PRODUCING THE SAME

(75) Inventors: Ming Liang Shiao, Collegeville, PA (US); Keith C. Hong, Lititz, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 157 days.

(21) Appl. No.: 12/056,010

(22) Filed: Mar. 26, 2008

(65) Prior Publication Data

US 2008/0248246 A1 Oct. 9, 2008

Related U.S. Application Data

(60) Provisional application No. 60/910,051, filed on Apr. 4, 2007.

(51) Int. Cl.

| | |
|---|---|
| ***D06N 7/00*** | (2006.01) |
| ***D06N 7/04*** | (2006.01) |
| ***G11B 5/64*** | (2006.01) |
| ***E01F 9/04*** | (2006.01) |
| ***B32B 5/16*** | (2006.01) |
| ***B32B 9/00*** | (2006.01) |
| ***B32B 15/02*** | (2006.01) |
| ***B32B 17/02*** | (2006.01) |
| ***B32B 19/00*** | (2006.01) |
| ***B32B 21/02*** | (2006.01) |
| ***B32B 23/02*** | (2006.01) |
| ***B32B 27/02*** | (2006.01) |

(52) U.S. Cl. ........ 428/147; 428/141; 428/143; 428/402; 428/402.2; 428/402.21; 428/402.22; 428/402.24; 428/403; 428/404; 428/405; 428/406; 428/407

(58) Field of Classification Search .................. 428/143
See application file for complete search history.

(56) References Cited

U.S. PATENT DOCUMENTS

| | | | | |
|---|---|---|---|---|
| 2,591,149 A | | 4/1952 | Grove | |
| 2,614,051 A | | 10/1952 | Buzzell et al. | |
| 2,898,232 A | | 8/1959 | Miller et al. | |
| 2,981,636 A | | 4/1961 | Lodge et al. | |
| 3,998,644 A | | 12/1976 | Lodge | |
| 4,036,661 A | | 7/1977 | Schmidt et al. | |
| 4,234,639 A | * | 11/1980 | Graham | 428/144 |
| 4,312,673 A | | 1/1982 | Neely, Jr. | |
| 4,378,408 A | | 3/1983 | Joedicke | |
| 4,895,754 A | | 1/1990 | Graham et al. | |
| 5,055,135 A | | 10/1991 | Grube et al. | |
| 5,411,803 A | | 5/1995 | George et al. | |
| 5,437,923 A | | 8/1995 | Kalkanoglu | |
| 5,466,280 A | | 11/1995 | Lee et al. | |
| 5,723,516 A | | 3/1998 | Bigham et al. | |

(Continued)

FOREIGN PATENT DOCUMENTS

FR 2670506 12/1990

(Continued)

*Primary Examiner* — Maria Veronica Ewald
*Assistant Examiner* — Nathan Van Sell
(74) *Attorney, Agent, or Firm* — Paul & Paul

(57) ABSTRACT

An asphalt-based sheet roofing material includes capsules on its upper surface. When struck, as by hailstones, the capsules break to release a film forming fluid that spreads over the surface to heal the damage created by the hailstones.

14 Claims, 2 Drawing Sheets

U.S. PATENT DOCUMENTS 6,143,318 A 11/2000 Gilchrist et al.
6,310,122 B1 10/2001 Butler et al.
6,426,309 B1 7/2002 Miller et al.
6,620,487 B1 * 9/2003 Tonyan et al. ................ 428/192
6,703,127 B2 3/2004 Davis et al.
6,758,019 B2 7/2004 Kalkanoglu et al.
7,059,800 B2 6/2006 Jones et al.
7,066,998 B2 6/2006 Rohrbaugh et al.
7,125,601 B1 10/2006 Pinault et al.
7,241,500 B2 7/2007 Shiao et al.
2003/0060569 A1 3/2003 White et al.
2004/0255548 A1 12/2004 Hong et al.
2004/0258835 A1 12/2004 Hong et al.
2005/0072114 A1 4/2005 Shiao et al.
2005/0197248 A1 9/2005 Ohtsu et al.
2005/0202100 A1 * 9/2005 Dekkers et al. ............... 424/618
2006/0042504 A1 * 3/2006 Kumar et al. .............. 106/14.34
2007/0092734 A1 4/2007 Durandeau et al.
2007/0148340 A1 6/2007 Kalkanoglu et al.
2007/0148342 A1 6/2007 Kalkanoglu et al.
2008/0008832 A1 1/2008 Shiao et al.

FOREIGN PATENT DOCUMENTS

FR 2857030 7/2003
WO 03087002 10/2003
WO 2006049865 5/2006

* cited by examiner

MINERAL SURFACED ASPHALT-BASED ROOFING PRODUCTS WITH ENCAPSULATED HEALING AGENTS AND METHODS OF PRODUCING THE SAME

CROSS-REFERENCE TO RELATED APPLICATION

This application claims the priority of U.S. Provisional Application No. 60/910,051 filed Apr. 4, 2007.

BACKGROUND OF THE INVENTION

1. Field of the Invention

The present invention relates to asphalt-based roofing materials such as shingles and processes for the manufacture of asphalt-based roofing materials.

2. Brief Description of the Prior Art

Asphalt-based roofing materials are ubiquitous in North America. Typically, these materials take the form of sheets or shingles which include a fibrous web embedded in a layer of a bituminous, asphalt-based composition to form a membrane which provides water resistance. Mineral-based granules are typically adhered to the exposed portions of the upper side of the sheet or shingle to provide a desirable aesthetic effect and to protect the underlying asphalt-based composition from harmful ultraviolet radiation.

It is important to ensure that the roofing granules adhere to the asphalt substrate during the life of a shingle as it exposed to outdoor environments. However, adhesion of the roofing granules can be disrupted by impact forces, particularly those arising from hail storms. As a result, asphalt shingles can suffer from excessive granule loss due to the impact damage of hail or other projectiles. This not only can cause undesirable appearance of black spots on the roof, but also can result in premature failure in shingles by exposing the underlying asphalt to harmful UV radiation.

Also, some shingles or roofing membranes may suffer from cracking or puncture damage during an extreme severe hail storm. This can result in leaking or further water damage to the roof assembly or interior of a house. Thus, it is advantageous to have asphalt shingles with increased resistance to damages due to impact events.

Improved impact resistance is disclosed in U.S. Pat. No. 6,426,309 for asphalt-based roofing materials which include a protective coating adhered to the upper surface of the asphalt coating, a layer of granules adhered to the protective coating, and a web bonded to the lower region of the asphalt coating. The impact resistance of these roofing materials is improved, as the protective coating is disclosed to prevent excessive granule loss while the web is disclosed to act to stop crack propagation.

A wind-resistant shingle and a method of making it is disclosed in U.S. Pat. No. 6,758,019 in which the rear surface of the shingle is provided with an attached reinforcement layer, which resists upwardly wind-applied bending torque when the shingle is installed on a roof, such that the failure of the shingle when it is bent beyond its elastic limit, is resisted until the shingle has absorbed a high percentage of applied torque.

A method of repairing cracks in a paved asphaltic surface is disclosed by U.S. Pat. No. 7,059,800. A layer of liquefied asphalt is applied to a cracked, paved surface, and a reinforcement mat is then applied over the liquefied asphalt, which penetrates and soaks the reinforcement mat to form a water barrier. Finally, a layer of paving material is applied over the mat. Although it is known to apply a surface coating onto a roof after the roofing shingles have been installed to protect the shingles from granule loss and other damage, such surface coatings can be expensive and require additional labor to apply after the roofing shingles have been installed.

Improved granule adhesion is disclosed in U.S. Pat. No. 7,125,601. An integrated granule product includes a film having a plurality of ceramic coated granules bonded to the film by a cured adhesive. The film can then be applied over a roofing substrate. For example, the integrated granule product can be applied onto an asphalt-based substrate to form a roofing shingle.

There is a continuing need to extend the effective service life of roofs surfaced with asphalt-based roofing materials, and in particular to extend the life of roofs experiencing impact damage from hail and like circumstances.

SUMMARY OF THE INVENTION

The present invention provides an improved, self-healing asphalt-based sheet roofing material, in the form of roofing shingles, roll roofing, and the like. The asphalt-based sheet roofing material of the present invention comprises a bituminous binder and having an upper surface, at least a portion of which is provided with a plurality of capsules. Preferably, at least a portion of the upper surface of the roofing material is also provided with roofing granules. Preferably, the portion of the upper surface that is provided with capsules is coextensive with the portion of the upper surface that is provided with roofing granules. Preferably, the capsules have an average size that is smaller than the average size of the roofing granules. Preferably, the capsules range in size from US mesh #18 to US mesh #50. The capsules have an outer wall and an inner cavity, with the outer wall being susceptible to being ruptured by mechanical impact. The inner cavity is provided with at least one functional material. In one embodiment of the present invention, the at least one functional material preferably comprises a liquid film-forming composition. In another embodiment of the present invention, the at least one functional material comprises at least one solvent component, the bituminous binder being soluble in the at least one solvent component of the functional material. Optionally, the functional material comprises at least one pigment. Optionally, the functional material comprises at least one biocide. Preferably, the functional material is selected from the group consisting of adhesives, adhesion promoters, coating compositions, such as asphalt-based coating compositions, asphalt-based emulsions, and plasticizers. Preferably, the material forming the outer wall of the capsules has a compressive strength greater than about 100 psi and less than about 30,000 psi. Preferably, the outer wall is formed from a material selected from the group consisting of glass, ceramic materials, and polymeric materials. In one embodiment of the present invention, it is preferred that the outer wall of the capsules comprises a capsule binder and at least one pigment. Preferably, the at least one pigment is a solar reflective pigment.

The present invention also provides a process for preparing a bituminous asphalt-based sheet roofing material. The process comprises providing a base sheet comprising an upper layer of a bituminous composition. Preferably, the base sheet comprises a bituminous composition reinforced with fiber, preferably in the form of a web of glass fiber. Preferably, the base sheet is provided at a temperature above the softening point of the bituminous composition. The process further comprises depositing a plurality of roofing granules on at least a portion of the upper surface of the base sheet. The process further comprises depositing a plurality of capsules on at least a portion of the upper surface of the base sheet. In one embodiment of the process of the present invention, the process further comprises mixing roofing granules with capsules and depositing the mixture of the roofing granules and the capsules on at least a portion of the upper surface of the base sheet. In another embodiment of the process of the present invention, capsules are deposited before the roofing granules are deposited. In yet another embodiment of the process of the present invention, roofing granules are deposited before capsules are deposited.

DETAILED DESCRIPTION

The present invention provides a solution to the problem of impact-induced damage of asphalt-based, mineral surfaced shingles or roofing membranes. Such damage can be reduced or eliminated through the use of "self-healing" capsules that will rupture upon impact and dispense at least one functional material to help repair the damage to the shingles or roofing membranes. The "self-healing" capsules preferably have a shell or wall that has enough strength to endure the manufacturing operation of shingle making and normal foot traffic without rupture, and yet is weak enough to be easily broken upon impact of sizable hail stones. The shell can also be pigmented to contribute to or enhance the shingle color or surface solar reflectance. Preferably, the shell comprises a hard material such as glass, ceramics, or suitable polymers that are durable and inert toward the encapsulated multifunctional agents. The at least one functional material may comprise adhesives, adhesion promoters, coatings, asphalt-based coatings or emulsions, or plasticizers, or a mixture thereof, to prevent excessive granule loss or to mend cracks resulting from impact. The at least one functional material can further comprise pigments to enhance appearance or solar reflectance, or biocides to control undesirable fungi or algae growth.

The "self-healing" capsules can be deposited onto asphalt coating surface prior to dropping of colored roofing granules, or premixed with roofing granules then followed by typical granule dropping and pressing operation. The self-healing capsules can also be deposited onto hot asphalt surface immediately after granule dropping to fill in the gaps between granules. Such manufacturing techniques will become more apparent to those who are skilled in the art.

Figure 3:
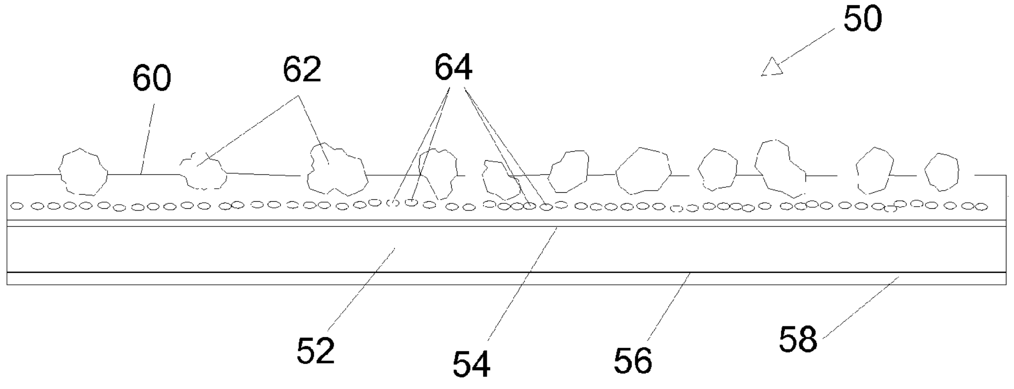
FIG. 3 is a schematic sectional elevation view of an asphalt-based sheet roofing material according to a third embodiment of the present invention.
Figure 4:
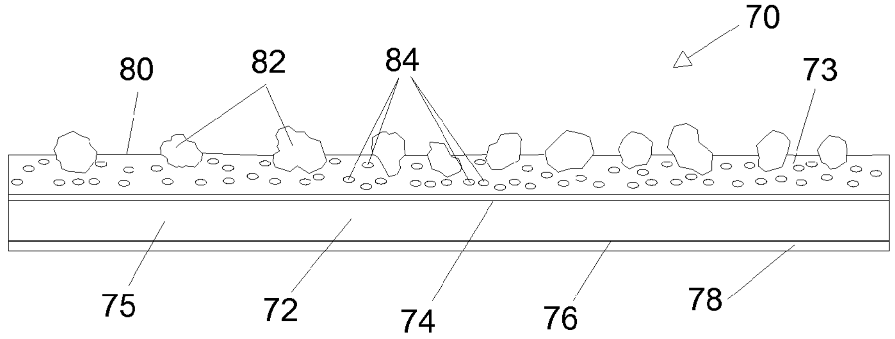
FIG. 4 is a schematic sectional elevation view of an asphalt-based sheet roofing material according to a fourth embodiment of the present invention.
Figure 5:
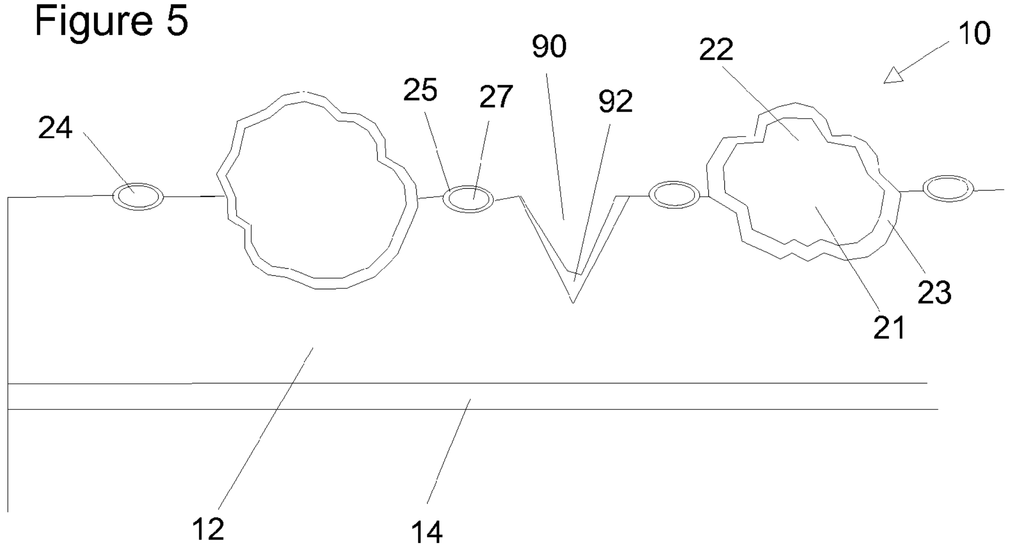
FIG. 5 is a schematic, fragmentary section view of the asphalt-based sheet roofing material of FIG. 1 shown after experiencing mechanical damage from contact with hail.

Referring now to the drawings, in which like reference numerals refer to like elements in each of the several views, there are shown schematically in FIGS. 1, 2, 3 and 4 examples of asphalt-based sheet roofing material according to the present invention, while FIG. 5 illustrates the "self-healing" of the roofing material after a damaging impact by hail.

Figure 1:
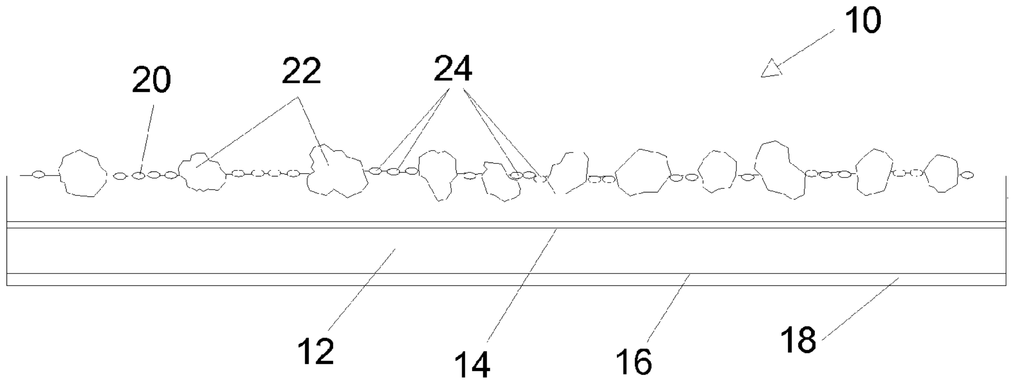
FIG. 1 is a schematic sectional elevation view of an asphalt-based sheet roofing material according to a first embodiment of the present invention.

FIG. 1 is a schematic cross-sectional representation of a first embodiment of asphalt-based sheet roofing material 10 according to the present invention. The roofing material 10 includes an asphalt-based bituminous membrane 12 which is reinforced with an embedded web 14 of glass fibers. The roofing material 10 has a lower surface or back 16 which is covered with a surfacing material 18 and an upper surface 20. Embedded in at least a portion of the upper surface 20 is a plurality of colored roofing granules 22, each formed from a mineral core covered with a ceramic coating layer colored with a metal oxide colorant. Extending on and partially embedded in the upper surface in between the colored roofing granules 22 is a plurality of capsules 24 each having an outer wall and filled with a liquid film forming composition.

In manufacturing the asphalt-based sheet roofing material 10 a continuous sheet of the glass fiber web 14 is fed through one or more tanks containing a molten asphalt-based bituminous composition at an elevated temperature to coat and impregnate the web 14 with the asphalt-based bituminous composition (not shown) in order to form the bituminous membrane 12. While the bituminous composition is still warm and soft, the roofing granules 22 are dropped onto at least a portion of the upper surface of the bituminous membrane 12 and become partially embedded therein (not shown). Subsequently, while the bituminous membrane remains warm and soft, the capsules 24 are dropped onto at least a portion of the upper surface of the bituminous membrane, and the capsules adhere to and become partially embedded in the portion of the bituminous membrane that is not covered by the previously deposited roofing granules, as shown in FIG. 1.

Figure 2:
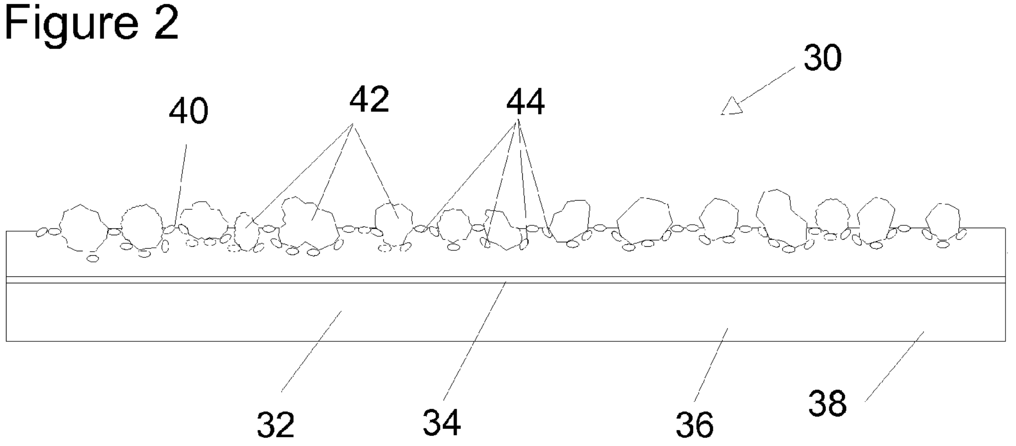
FIG. 2 is a schematic sectional elevation view of an asphalt-based sheet roofing material according to a second embodiment of the present invention.

FIG. 2 is a schematic cross-sectional representation of a second embodiment of asphalt-based sheet roofing material 30 according to the present invention. As in the case of the above-described first embodiment, the roofing material 30 includes an asphalt-based bituminous membrane 32 which is reinforced with an embedded web 34 of glass fibers. The roofing material 30 has a lower surface or back 36 which is covered with a surfacing material 38 and an upper surface 40. Embedded in at least a portion of the upper surface 40 is a plurality of colored roofing granules 42, each formed from a mineral core covered with a ceramic coating layer colored with a metal oxide colorant. Extending on and partially embedded in the upper surface in between and beneath the colored roofing granules 42 is a plurality of capsules 44 each having an outer wall and filled with a liquid film forming composition. Thus, in this embodiment, a greater density of capsules 44 can be embedded in the bituminous membrane 32 than in the case of the first embodiment, because the capsules 44 lie both in between the roofing granule 42, as in the case of the first embodiment, but also underneath the roofing granules 42, unlike the case of the first embodiment.

In manufacturing the asphalt-based sheet roofing material 30 of this second embodiment, a continuous sheet of the glass fiber web 34 is fed through one or more tanks containing a molten asphalt-based bituminous composition at an elevated temperature to coat and impregnate the web 34 with the asphalt-based bituminous composition (not shown) in order to form the bituminous membrane 32, as in the case of the first embodiment. However, in the case of this second embodiment, while the bituminous composition is still warm and soft, the capsules 44 are dropped onto at least a portion of the upper surface of the bituminous membrane, and the capsules adhere to and become partially embedded in the bituminous membrane (not shown). Subsequently, while the bituminous membrane remains warm and soft, the roofing granules 42 are dropped onto at least a portion of the upper surface of the bituminous membrane 42 and become partially embedded therein, and in the process push down underlying capsule deeper into the membrane, to provide the asphalt-based sheet roofing material shown in FIG. 2.

FIG. 3 is a schematic cross-sectional representation of a third embodiment of asphalt-based sheet roofing material 50 according to the present invention. As in the cases of the above-described first and second embodiments, the roofing material 50 includes an asphalt-based bituminous membrane 52 which is reinforced with an embedded web 54 of glass fibers. The roofing material 50 has a lower surface or back 56 which is covered with a surfacing material 58 and an upper surface 60. Embedded in at least a portion of the upper surface 60 is a plurality of colored roofing granules 62, each formed from a mineral core covered with a ceramic coating layer colored with a metal oxide colorant. Extending within and completely embedded in the bituminous membrane 52 beneath both the upper surface 60 and the colored roofing granules 62 is a plurality of capsules 64 each having an outer wall and filled with a liquid film forming composition. The capsules 62 lie generally in a plane parallel to the upper surface 60 within the bituminous membrane 52. Thus, in this third embodiment, a greater density of capsules 64 can be embedded in the bituminous membrane 52 than in the case of the first embodiment, because the capsules 64 lie underneath the roofing granules 62, unlike the case of the first embodiment.

In manufacturing the asphalt-based sheet roofing material 50 of this third embodiment, a continuous sheet of the glass fiber web 54 is fed through one or more tanks containing a molten asphalt-based bituminous composition at an elevated temperature to coat and impregnate the web 54 with the asphalt-based bituminous composition (not shown) in order to form the bituminous membrane 52, as in the case of the first and second embodiments. However, in the case of this third embodiment, while the bituminous composition is still warm and soft, the capsules 64 are dropped onto at least a portion of the upper surface of the bituminous membrane, and the capsules adhere to and become partially embedded in the bituminous membrane (not shown). Subsequently, another layer of bituminous coating composition is applied over the capsules, and then, while the bituminous membrane remains warm and soft, the roofing granules 62 are dropped onto at least a portion of the upper surface of the bituminous membrane 52 and become partially embedded therein, to provide the asphalt-based sheet roofing material shown in FIG. 3. The additional layer of bituminous composition overlying the capsules 64 protects the capsules 64 against mechanical damage through contact with roofing granules 62 when the roofing granules 62 are dropped.

FIG. 4 is a schematic cross-sectional representation of a fourth embodiment of asphalt-based sheet roofing material 70 according to the present invention. As in the cases of the above-described first, second and third embodiments, the roofing material 70 includes an asphalt-based bituminous membrane 72 which is reinforced with an embedded web 74 of glass fibers, the web 74 dividing the membrane 72 into a layer 73 above the web 74 and a layer 75 below the web. The roofing material 70 has a lower surface or back 76 which is covered with a surfacing material 78 and an upper surface 80. Embedded in at least a portion of the upper surface 80 is a plurality of colored roofing granules 82, each formed from a mineral core covered with a ceramic coating layer colored with a metal oxide colorant. Extending within and completely embedded in the bituminous membrane 72 beneath both the upper surface 80 and the colored roofing granules 82 is a plurality of capsules 84 each having an outer wall and filled with a liquid film forming composition. The capsules 84 are randomly distributed in the layer of bituminous material 73 above the glass fiber web 74. Thus, as in the case of the third embodiment, in this fourth embodiment, a greater density of capsules 84 can be embedded in the bituminous membrane 72 than in the case of the first embodiment, because the capsules 84 lie underneath the roofing granules 82, unlike the case of the first embodiment. Furthermore, because the capsules 84 are not confined to lying in a plane as in the case of the third embodiment, a higher density of capsules 84 can be achieved than in the case of the third embodiment.

In manufacturing the asphalt-based sheet roofing material 70 of this fourth embodiment, a continuous sheet of the glass fiber web 74 is fed through one or more tanks containing a molten asphalt-based bituminous composition at an elevated temperature to coat and impregnate the web 74 with the asphalt-based bituminous composition (not shown) in order to form the bituminous membrane 72, as in the case of the first, second and third embodiments. However, in the case of this fourth embodiment, while the capsules 84 are mixed with molten bituminous material to form a suspension and the web 74 is passed through the suspension to coat the upper side of the web with the bituminous material containing the suspended capsules 84 and form the upper layer 73 of the bituminous membrane 72 (not shown). Subsequently, while the upper layer 73 remains warm and soft, the roofing granules 82 are dropped onto at least a portion of the upper surface of the bituminous membrane 72 and become partially embedded therein, to provide the asphalt-based sheet roofing material shown in FIG. 4.

FIG. 5 is an enlarged, fragmentary schematic sectional view of the asphalt-based sheet roofing material 10 shown in FIG. 1, after the roofing material 10 has sustained mechanical damage in the form of a crack 90 in the upper surface 20 after being impacted by a large hailstone (not shown). The hailstone has ruptured several of the capsules 24, which comprise, when intact, an outer wall or shell 25 filled a film-forming composition 27, comprising an acrylic latex polymer emulsion in which is suspended a solar-reflective pigment such as titanium dioxide. The fluid film-forming composition 27 from the ruptured capsules 24 has flowed into the crack 90 to form a liquid layer covering the crack 90, and the liquid layer has subsequently cured to provide a protective film 92 over the crack 90, thus "healing" the crack 90. The protective film 92 includes a solar-reflective pigment which helps protect the upper surface 20 from environmental degradation resulting from exposure to solar radiation, as does the colored coating 23 covering the exterior of the mineral cores 21 of the roofing granules 22.

The present invention provides asphalt-based sheet roofing materials provided with capsules including at least one functional material. Preferably, the at least one functional material is selected or formulated to provide good long-term stability, comparable to the anticipated service life of the roofing material in which the capsules are to be incorporated. In addition, it is preferred that the at least one functional material be selected or formulated to display good adhesion to the surface of bituminous membranes. In one aspect of the present invention, the at least one functional material comprises a liquid film-forming composition. Liquid film-forming compositions are well-known in the coatings art, and include solvent and aqueous coating compositions. Preferably, such film-forming compositions are formulated to have surface energy characteristics promoting their "wetting out" and spreading on the surface of bituminous membranes. Preferably, such film-forming compositions include at least one polymeric material, the at least one polymeric material preferably being selected from those polymeric materials that are resistant to photodegradation by exposure to solar radiation, such as acrylic polymeric materials. In one aspect, the at least one functional material includes at least one solvent component, such that the bituminous binder is at least partially soluble in the solvent component. In another aspect, the at least one functional material is selected from the group consisting of adhesives, adhesion promoters, coating compositions, asphalt-based emulsions and plasticizers. In this aspect, the coating composition is preferably an asphalt-based coating composition. Preferably, the at least one functional material includes at least one pigment. Preferably, the at least one pigment is a solar reflective pigment, such as titanium dioxide. Examples of solar reflective pigments that can be employed are disclosed, for example, in U.S. Pat. No. 7,241,500, incorporated herein by reference. In another aspect, the at least one functional material can include an inorganic or organic biocidal material, such as an algaecide, for example, cuprous oxide, zinc oxide, or a mixture thereof.

The at least one functional material can be encapsulated to form the capsules using conventional techniques for forming capsules, including such techniques as interfacial polymerization, phase separation/coacervation, spray drying, spray coating, fluid bed coating, supercritical anti-solvent precipitation, and the like. Techniques for encapsulating liquids are disclosed, for example, in U.S. Pat. No. 6,703,127. The "self-healing" capsules can be prepared by various methods, for example, by the method disclosed in the U.S. Patent Application Publication No. 2003/0060569 A1. Other methods will be apparent to those who are skilled in the art. Preferably, the capsules are formed with sufficient mechanical strength so that the capsules will withstand the process of manufacturing the asphalt-based sheet roofing material, storage and transportation of the asphalt-based sheet roofing material to a jobsite, installation of the asphalt-based sheet roofing material on a roof, and the impact of foot traffic on the installed asphalt-based roofing material, but are sufficiently fragile so that the capsule wall will rupture on impact by a hailstone sufficient to damage the roofing membrane. Thus, the capsule wall preferable has a compressive strength of from about 100 psi to 30,000 psi.

The preferred size of the capsules depends on whether they are to be adhered to the upper surface of the bituminous membrane or embedded under the surface of the bituminous membrane. When the capsules are to be adhered to the upper surface of the bituminous membrane, the capsules are preferably smaller in average size than the average size of the roofing granules, and more preferably sized to fit in between the roofing granules on the portion of the upper surface of the roofing membrane that would be otherwise exposed. In this case, the "self-healing" capsules preferably are smaller than typical roofing granules and larger than typical fillers. Thus, the capsules preferably range in size from about U.S. mesh #18 to U.S. mesh #50.

The capsules can be prepared from a composition including one or more colorant materials or pigments, to provide capsules having walls that are colored or pigmented. The capsules can include, for example, one or more solar reflective pigments, such as titanium dioxide. Alternatively, the capsules can be coated with one or more coating compositions which may include pigments such as solar reflective pigments.

When the capsules are distributed in a roofing material membrane, the capsules preferably have an average size that is less than the membrane thickness. Thus, when capsules are distributed in a roofing material membrane, the capsules preferably have an average size of from about 1 micrometer to 100 micrometers, and more preferably from about 2 micrometers to 50 micrometers.

The asphalt-based sheet roofing materials of the present invention can be manufactured using conventional roofing production processes. Typically, bituminous roofing products are sheet goods that include a non-woven base or scrim formed of a fibrous material, such as a glass fiber scrim. Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. Thus, the substrate is coated with one or more layers of a bituminous material such as asphalt to provide water and weather resistance to the roofing product. The reverse side of the substrate sheet can be coated with an anti-stick material such as a suitable mineral powder or fine sand. The upper side of the roofing product is typically coated with mineral granules to provide durability, reflect heat and solar radiation, and to protect the bituminous binder from environmental degradation. The roofing granules are typically distributed over selected portions of the upper side of the substrate, and the bituminous material serves as an adhesive to bind the roofing granules to the sheet when the bituminous material has cooled.

Roofing granules are generally used in asphalt-based roofing shingles or in roofing membranes to protect asphalt from harmful UV radiation and to add aesthetic values to a roof. Typically, roofing granules are produced by using inert mineral particles that are colored by pigments, clay, and alkali metal silicate binders in the processes as described by the U.S. Pat. Nos. 2,981,636, 4,378,408, 5,411,803, or 5,723,516.

In the asphalt-based roofing products of the present invention, conventional roofing granules can be employed, or one or more types of specialized roofing granules, such as algae-resistant roofing granules, such as disclosed in U.S. Patent Publications 2004/0255548 A1, 2004/0258835 A1, 2007/0148340 A1, and 2007/0148342 A1, all incorporated herein by reference, or solar-heat resistant roofing granules, such as disclosed in U.S. Pat. No. 7,241,500 and U.S. Patent Application Publications 2005/0072114 A1 and 2008/0008832 A1, all incorporated herein by reference, can be mixed with conventional roofing granules, and the granule mixture can be embedded in the surface of such bituminous roofing products using conventional methods.

Alternatively, one or more types of specialized roofing granules can be substituted for conventional roofing granules in the manufacture of bituminous roofing products to provide those roofing products with superior properties, such as resistance to biological discoloration and degradation, fire retardancy, or solar heat resistance. One or more classes of specialized roofing granules can be applied sequentially to the roofing product surface, optionally followed by application of conventional roofing granules. In one embodiment of the process of the present invention, a first class of specialized roofing granules is first applied to the surface of the roofing product, followed by application of a second class of specialized roofing granules, followed finally by application of conventional roofing granules. In another embodiment of the present invention, a mixture of two or more classes of specialized roofing granules is first applied to the surface of the roofing product, followed by application of conventional roofing granules. Given the order of application, any excess granules that are not successfully embedded in the surface of the roofing product are likely to be conventional granules.

Thus, the order of application of these embodiments of the process of the present invention is likely to permit more precise loading of the roofing product surface with the classes of specialized roofing granules than otherwise. In yet another embodiment, one or more classes of specialized roofing granules are applied to the surface of the roofing product.

The roofing product sheet can be cut into conventional shingle sizes and shapes (such as one foot by three feet rectangles), slots can be cut in the shingles to provide a plurality of "tabs" for ease of installation and aesthetic effects, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheets in selected portions of the shingle to provide an enhanced visual appearance, or to simulate other types of roofing products. Release strips can also be strategically applied to the shingles so as to line up with sealing adhesive so that stacked shingles can be packaged without the need for separate release paper covers for the additional adhesive.

The bituminous material used in manufacturing asphalt-based sheet roofing products according to the present invention is derived from a petroleum processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, oils, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

In asphalt shingles, the mass of roofing granules per unit of area generally lies between 0.5 and 2.5 kg $m^2$, preferably between 1 and 2 kg $m^2$.

It will be apparent from the foregoing that various modifications may be made in the details of the sheet roofing materials and the processes of this invention, all within the spirit and scope of the invention as defined in the appended claims.

The invention claimed is:

1. An asphalt-based sheet roofing material comprising a bituminous binder and having an exterior upper surface, the exterior upper surface being provided with a plurality of capsules partially embedded in the exterior upper surface, the capsules having an outer shell and an inner cavity, the outer shell being susceptible to being ruptured by mechanical impact, the outer shell having enough strength to endure the manufacturing operation of shingle making and normal foot traffic without rupture, the outer shell being weak enough to be broken upon impact of hail stones, the inner cavity being provided with at least one functional material.

2. A roofing material according to claim 1 wherein the at least one functional material comprises a liquid composition, the liquid composition being film forming.

3. A roofing material according to claim 1 wherein the at least one functional material comprises at least one solvent component, the bituminous binder being soluble in the at least one solvent component of the functional material.

4. A roofing material according to claim 1 wherein the functional material comprises at least one pigment.

5. A roofing material according to claim 1 wherein the functional material comprises at least one biocide.

6. A roofing material according to claim 1 wherein the functional material is selected from the group consisting of adhesives, adhesion promoters, coating compositions, asphalt-based emulsions, and plasticizers.

7. A roofing material according to claim 6 wherein the coating composition is an asphalt-based coating composition.

8. A roofing material according to claim 1, the outer shell of the capsules being formed from a shell-forming material, the shell-forming material having a compressive strength greater than 100 psi and less than 30,000 psi.

9. A roofing material according to claim 1 wherein the outer shell is formed from a material selected from the group consisting of glass, ceramic materials, and polymeric materials.

10. A roofing material according to claim 1 wherein the outer shell of the capsules comprises a capsule binder and at least one pigment.

11. A roofing material according to claim 10 wherein the at least one pigment is a solar reflective pigment.

12. A roofing material according to claim 2 wherein the upper surface being further provided with a plurality of roofing granules and the portion of the upper surface that is provided with capsules being coextensive with the portion of the upper surface that is provided with roofing granules.

13. A roofing material according to claim 1 wherein the capsules have an average size that is smaller than the average size of the roofing granules.

14. A roofing material according to claim 1 wherein the capsules range in size from about U.S. mesh #18 to U.S. mesh #50.

* * * * *